United States Patent [19]

Song et al.

[11] Patent Number: 5,391,657
[45] Date of Patent: Feb. 21, 1995

[54] METHOD FOR REDUCING SHEETING AND STATIC CHARGES DURING POLYMERIZATION OF ETHYLENE POLYMERS

[75] Inventors: Gyung-Ho Song, Charleston, W. Va.; Aaron S. Rhee, Belle Mead, N.J.; Gerald R. Lowder, Victoria, Tex.

[73] Assignee: Union Carbide Chemicals & Plastics Technology Corporaton, Danbury, Conn.

[21] Appl. No.: 127,779

[22] Filed: Sep. 27, 1993

[51] Int. Cl.$^6$ .................................. C08F 2/34
[52] U.S. Cl. ............................. 526/74; 526/78; 526/79; 526/101; 526/103; 526/107
[58] Field of Search ............. 526/74, 78, 79, 101, 526/103, 107

[56] References Cited

U.S. PATENT DOCUMENTS

| | | | |
|---|---|---|---|
| 4,460,755 | 7/1984 | Williams et al. | 526/84 |
| 4,532,311 | 7/1985 | Fulks et al. | 526/62 |
| 4,564,660 | 1/1986 | Williams et al. | 526/106 |
| 4,803,251 | 2/1989 | Goode et al. | 526/74 |
| 4,855,370 | 8/1989 | Chirillo et al. | 526/74 |
| 4,994,534 | 2/1991 | Rhee et al. | 526/88 |
| 5,194,526 | 3/1993 | Hussein et al. | 526/74 |

OTHER PUBLICATIONS

Toshihiko Oguchi et al., "*Contact Electrification in Inorganic Binary Compounds*", J. Electrochem. Soc., vol. 155, No. 4, pp. 841–847, Apr. 1986.

Primary Examiner—Joseph L. Schofer
Assistant Examiner—Tom Weber
Attorney, Agent, or Firm—B. L. Deppenbrock

[57] ABSTRACT

A method for reducing sheeting during polymerization of an alpha-olefin by feeding either a positive charge generating ($MgO$, $ZnO$, $Al_2O_3$, $CuO$, and mixtures thereof) or a negative charge generating ($V_2O_5$, $SiO_2$, $TiO_2$, $Fe_2O_3$, and mixtures thereof) inorganic chemical additive to the reactor responsive to particular static levels in the reactor. The chemical additive is added in amounts which substantially neutralizes the electrostatic charge in the reactor.

8 Claims, No Drawings

METHOD FOR REDUCING SHEETING AND STATIC CHARGES DURING POLYMERIZATION OF ETHYLENE POLYMERS

BACKGROUND OF THE INVENTION

1. Field of the Invention

The present invention relates to a method for reducing polymer sheeting during the polymerization of alpha-olefins, such as ethylene homopolymers and copolymers (including comonomers with a diene). More particularly, the present invention relates to a method for controlling and/or reducing static charges in a reactor, which charges contribute to sheeting.

2. Description of the Prior Art

Polymers of ethylene are conventionally produced in a fluidized bed reactor. During polymerization a phenomenon known as "sheeting" occurs. By "sheeting" is meant the adherence of fused catalyst and resin particles to the walls of the reactor.

In commercial reactors, sheets can vary widely in size, and are usually about ¼ to ½ inch thick and are from about one to five feet long, with a few even longer. They can have a width of about 3 inches to more than 18 inches. The sheets have a core composed of fused polymer which is oriented in the long direction of the sheets and their surfaces are covered with granular resin which is fused to the core. The edges of the sheets can have a hairy appearance from strands of fused polymer.

It has been found that there exists a strong correlation between polymer sheeting and the presence of excess electrostatic of static charges, either negative or positive, in the reactor during polymerization. This is evidenced by sudden changes in static levels followed closely by deviation in temperatures at the reactor wall. These temperature deviations are either high or low. Low temperatures indicate particle adhesion causing an insulating effect from the bed temperature. High deviations indicate reaction taking place in zones of limited heat transfer. Following this, disruption in fluidization patterns is generally evident, such as, for example, catalyst feed interruption, plugging of the product discharge system, the occurrence of thin fused agglomerates (sheets) in the product.

Oguchi and Tamatani in an article entitled, "Contact Electrification in Inorganic Binary Compounds," *J. Electrochem Soc.*, Solid State Science and Technology, April 1986, p. 841–847, discuss the measurement of the amount of electric charge induced on a wide variety of powder samples by contact with another reference powder using a blow-off method and apparatus.

U.S. Pat. No. 4,855,370 relates to a method for reducing sheeting during polymerization of alpha-olefins in a low pressure fluidized bed reactor utilizing titanium or vanadium based compounds as catalysts together with alkyl aluminum cocatalysts. The method comprises introducing water into the reactor in an amount sufficient to maintain the electrostatic levels at the site of possible sheet formation at levels which avoid sheeting without substantially altering the effectiveness of said catalysts.

U.S. Pat. No. 4,803,251 also relates to a method for reducing sheeting during polymerization of alpha-olefins in a low pressure fluidized bed reactor utilizing titanium or vanadium based compounds as catalysts together with alkyl aluminum cocatalysts. The method comprises determining the electrostatic levels at the site of possible sheet formations in the reactor. If negative electrostatic levels are indicated then a positive charge generating additive selected from the group consisting of an alcohol containing 1 to 7 carbon atoms, oxygen, and nitric oxide is added to the reactor. If positive electrostatic levels are indicated in the reactor, then a negative charge generating chemical additive is added to the reactor. The negative charge generating chemical additive is a ketone containing up to 7 carbon atoms. The positive or negative charge generating chemical additives are added to the reactor as required in an amount sufficient to create and maintain neutral static charges in the reactor.

Unfortunately, the introduction to the reactor of the additives set forth in the above-mentioned patents can adversely interfere with polymerization and/or the catalyst, i.e., they act as poisons to the system. Accordingly, there is an on-going need to provide a method to reduce sheeting and/or control or reduce static charges in the reactor during polymerization.

SUMMARY OF THE INVENTION

The present invention provides a method for reducing sheeting during polymerization of one or more olefin monomers in a fluidized bed reactor which comprises: 1) continuously monitoring electrostatic levels in the reactor and; 2) adding a positive charge generating inorganic chemical additive selected from among MgO, ZnO, $Al_2O_3$, CuO and mixtures thereof to the reactor, when negative electrostatic levels are detected; or 3) adding a negative charge generating inorganic chemical additive selected from among $V_2O_5$, $SiO_2$, $TiO_2$, $Fe_2O_3$, and mixtures thereof to the reactor, when positive electrostatic levels are detected in amounts sufficient to create and maintain essentially neutral static charges in the reactor.

DETAILED DESCRIPTION OF THE INVENTION

Sheeting can be substantially reduced and in some cases entirely eliminated by controlling static voltage in the fluidized bed at a site proximate to the reactor walls below the critical level for sheet formation. Sheeting has been extensively discussed in U.S. Pat. Nos. 4,532,311; 4,803,251; and 4,855,370. In general, sheeting is evidenced by one or more reactor thermocouples registering a temperature excursion of up to 20° C. above the temperature of the fluidized bed. The static voltage level for sheet formation is not a fixed value, but is a complex function dependent on variables including resin sintering temperature, operating temperature, drag forces in the fluidized bed, resin particle size distribution and recycle gas composition.

Positive and Negative Charge Generating Inorganic Chemical Additives

In the present invention additives are used to reduce or prohibit sheeting formation by reduction of charge generation in a reactor or to increase the rate of charge dissipation in a reactor. The additives can reduce static charges in the feed line, in the reactor itself, or on the catalyst support during polymerization processing. The chemical additives employed in the invention are inert solids in particulate, powder, or granular form. Since the additives are inert they are less likely to act as poisons for the catalyst or adversely affect product properties and characteristics. The negative charge and positive charge generating additives can optionally be calcined. The additives can exist as single particles (less than 1 micron) or as aggregates of particles ranging in size from 0.01 to 200 microns, typically averaging 10 to 100 microns. The additive can be introduced to the reactor independently of or along with other components employed in the polymerization process. Preferably, the additive is added independently of the other components with the reaction in progress.

Positive charge generating inorganic chemical additives can be selected from the group consisting of magnesium oxide (MgO), zinc oxide (ZnO), aluminum oxide or alumina ($Al_2O_3$), copper (II) oxide or cupric oxide (CuO), and mixtures thereof. Preferably, the positive charge generating additives are selected from the group consisting of MgO, ZnO, and mixtures thereof and; most preferably, MgO is employed in the present invention.

Negative charge generating inorganic chemical additives can be selected from the group consisting of vanadium oxide ($V_2O_5$), silicon (IV) oxide ($SiO_2$), titanium (IV) oxide ($TiO_2$), iron (III) oxide or ferric oxide ($Fe_2O_5$) and mixtures thereof. Preferably, the negative charge generating additives are selected from the group consisting of $SiO_2$, $TiO_2$ and mixtures thereof; and, most preferably, $SiO_2$ is employed in the present invention.

The amount and type of chemical additive which is added to the reactor depends on the static voltage within the reactor. The amount of positive or negative charge generating inorganic chemical additive or mixture thereof in the range of about 0.05 to about 25%, preferably about 0.1% to 2%, based on total weight of the polymer can be employed. It is preferred to employ amounts of the chemical additive or mixture of additives which generate sufficient positive or negative charges to neutralize negative or positive static charges, respectively.

While not particularly cost effective, it is understood that the present invention can be practiced using a mixture of at least one positive charge generating inorganic chemical additive and at least one negative charge generating chemical additive. Preferably, these mixtures can be selected from the group consisting of $SiO_2$/MgO; $TiO_2$/MgO; $SiO_2$/ZnO; $TiO_2$/ZnO; $SiO_2$/MgO/ZnO; and $SiO_2$/$TiO_2$/MgO. For a two component mixture the amount of each component in the mixture ranges from 99.9:0.1 to 0.1 to 99.9; preferably from 99:1 to 1:99; and most preferably 95:5 to 1:1 weight percent based upon the total weight the mixture. For a three component mixture the ratio of negative generating component to each of the positive generating components ranges from about 98:1:1 to 1:1:98, preferably from about 50:40:10 to 50:10:40 and most preferably is 95:4:1 to 95:1:4. Two or more charge generating additives can be introduced into the reactor independently, as a physical mixture, or as a chemically bonded blend.

Static voltage in the reactor can be monitored near the reactor wall at or below the site of possible sheet formation by one or more static voltage indicators, such as, for example, voltmeters, voltage probes, or electrodes, having a voltage range of about −15,000 to +15,000 volts. With a reaction in progress, changes in static voltage levels from neutral to positive can be counteracted by feeding a negative charge generating chemical additive to the reactor during polymerization using a feeding means such as, for example, through a hopper or adding the additive to the ethylene stream. Alternatively, changes in static voltage levels from neutral to negative can be counteracted by feeding a positive generating additive to the reactor during polymerization. Mixtures of positive and negative generating inorganic additives can also be introduced in the reactor as a single physical mixture via a hopper; each delivered independently via two feeders or hoppers; or as a chemically bonded entity such as a refractory oxide support for the catalyst. If this is not performed, impending agglomerate formation will likely create a process upset. Care must be exercised to avoid excessive chemical additives which can result in unwanted static voltage levels. The positive and negative charge generating inorganic chemical additives can be added or fed to the system in a variety of ways known to those skilled in the art. One such feeding arrangement can include, for example, the use of one or more feeders at a point below or above the distributor plate of the reactor. While the positive or negative charge generating inorganic chemical additive can be added continuously to the reactor, preferrably it is added when the static charge varies from about ±500 to ±1000 volts in a pilot plant scale reactor or from about ±10,000 to ±20,000 volts in a commercial reactor.

Polymers

The method of the present invention is primarily directed to polymers whose preparation or polymerization can produce sheeting or a build-up of electrostatic charges. Typically, these polymers are prepared by well-known polymerization reactions conducted in the presence of titanium or vanadium catalysts. These polymers are are alpha-olefins such as, for example, linear homopolymers of ethylene, linear copolymers of a major mole percent ($\geq 90\%$) of ethylene and a minor mole percent ($\geq 10\%$) of one or more $C_3$ to $C_8$ alpha-olefins, and so-called "sticky polymers". The $C_3$ to $C_8$ alpha olefins should not contain any branching on any of their carbon atoms which is closer than the fourth carbon atom. The preferred $C_3$ to $C_8$ alpha-olefins are propylene, butene-1, pentene-1, hexene-1, 4-methylpentene-1, heptene-1, and octene-1. This description is not intended to exclude the use of this invention with alpha olefin homopolymer and copolymer resins in which ethylene is not a monomer.

The homopolymers and copolymers have a density ranging from about 0.97 to 0.91. The density of the copolymer, at a given melt index level is primarily regulated by the amount of the $C_3$ to $C_8$ comonomer which is copolymerized with the ethylene. Thus, the addition of progressively larger amounts of the comonomers to the copolymers results in a progressive lowering of the density of the copolymer. The amount of each of the various $C_3$ to $C_8$ comonomers needed to achieve the same result will vary from monomers to monomer, under the same reaction conditions. In the absence of the comonomer, the ethylene would homopolymerize. The melt index of a homopolymer or copolymer is a reflection of its molecular weight. Polymers having a relatively high molecular weight, have relatively high viscosities and low melt index.

The method of the present invention can be employed advantageously in the direct conversion of a polymerization reaction of an alpha-olefin catalyzed by a Ziegler-type catalyst into one catalyzed by a chromium-based catalyst. Such direct conversions are taught, for example, in U.S. Pat. Nos. 4,460,755 and 4,564,660 which are incorporated herein by reference. In U.S. Pat. No. 4,460,755 a hydroxyl-containing compound, such as silica or alumina is added to the reactor before the introduction of the chromium-based catalyst. And in U.S. Pat. No. 4,564,660 an alkylaluminum compound and a hydroxyl-containing catalyst is added prior to the commencement of polymerization in the presence of the chromium-based catalyst. In such direct conversion procedures, a high negative static charge can form, which normally induces sheeting and reactor shutdown. In these direct conversion procedures, the method of the present invention is employed by adding a positive or a negative charge generating inorganic chemical additive or mixture thereof to the reactor along with or in lieu of the hydroxyl-containing compound and/or alkylaluminum compound. Preferably, a positive charge generating inorganic chemical additive such as MgO and ZnO can be added to the reactor along with such compounds. The positive charge generating inorganic chemical additive is preferably added in the range of 0.1% to 50% by weight based upon the total weight of the such compounds. Alternatively, the positive charge generating additive can be mixed with the compounds prior to introducing the compounds to the reactor.

A sticky polymer is a polymer, which, although particulate at temperatures below the sticking or softening temperature, agglomerates at temperatures above the sticking or softening temperature (i.e., the temperature at which fluidization ceases due to excessive agglomeration of particles in the bed). A process and apparatus which can be used to produce sticky polymers is disclosed in U.S. Pat. No. 4,994,534 which process is incorporated herein by reference. Such polymers can be an ethylene propylene rubber, an ethylene propylene diene termonomer rubber, a polybutadiene rubber, or a high ethylene content propylene block copolymer. Examples of sticky polymers whose polymerization process can be benefited by the present invention include ethylene/propylene rubbers and ethylene/propylene/diene termonomer rubbers, polybutadiene rubbers, high ethylene content propylene/ethylene block copolymers, poly(1 butene) (when produced under certain reaction conditions), very low density (low modulus) polyethylenes, i.e., ethylene butene rubbers or hexene containing terpolymers, ethylene/propylene/ethylidene-norbornene and ethylene/propylene hexadiene terpolymers of low density. A particularly preferred sticky polymer whose preparation is benefited by the present invention is an ethylene/propylene rubber containing 25 to 65 percent, by weight, propylene. This material is sticky to the touch at reactor temperatures of 20° C. to 40° C. or higher and has a severe tendency to agglomerate when allowed to settle for periods of more than two to five minutes. Another preferred sticky resin is an ethylene/butene copolymer produced at reactor temperatures of 50° C. to 80° C. at density levels of 880 to 905 kilograms per cubic meter and melt index levels of 1 to 20 and chlorinated or chlorosulfonated after being produced in the fluidized bed reactor.

In general, in the preparation of sticky polymers, the inert particulate materials which cause excessive negative static charges in the reactor are those of the inorganic oxide type. These include for example calcined silica, clays, talc, calcium carbonate and other like materials, commonly referred to as white fluidization aids. Carbon black, which also can be employed, however, does not generate negative static and can neutralize static charges. Unfortunately, products made with even low levels of carbon black are black and are not satisfactory for making colorable products. Therefore, the method of the present invention can be employed to reduce or neutralize such static charges produced when white fluidization aids are used. In response to the formation of negative electrostatic charge during the polymerization of sticky polymers, a positive charge generating inorganic chemical additive such as MgO of the present invention is added to the reactor. In a preferred embodiment, carbon black is employed initially as the fluidization aid, but it is then replaced with a colorable fluidization aid and a charge generating inorganic chemical additive of the method of the present invention.

EXAMPLES

The following examples will further illustrate the present invention.

Examples 1 through 7 illustrate various aspects of the present invention as employed in EPM (ethylene/propylene monomer) and EPDM (ethylene/propylene diene monomer) polymerizations in a gas-phase, fluidized bed reactor as described in U.S. Pat. No. 4,994,534. In general, these polymerization reactions in Examples 1 through 7 used a Ziegler-Natta catalyst which was either a titanium-based catalyst supported on silica or a vanadium-based catalyst supported on silica. Triisobutylaluminum (TIBA), diethyl aluminum chloride (DEAC) or triethylaluminum (TEAL) was used as a cocatalyst. Freon, chloroform or ethyl trichloroacetate (ETCA) was used as a promoter for the vanadium-based catalyst polymerization reactions. Since only a small amount of such cocatalyst and promoter was needed for a polymerization reaction, typically a 5-10 wt. % solution with isopentane was prepared and fed into the reactor to facilitate control of the feed rate. Reactor total pressure was maintained typically at about 300 psi. Ethylene, hydrogen, and comonomers (combinations of propylene and a diene) were continuously fed to the reactor. The partial pressure of ethylene was typically 120 psi for the vanadium-based catalyst reaction and 50 psi for the titanium-based catalyst reaction unless specified otherwise in the Examples. An inert particulate material fluidization aid such as calcined silica (calcined to remove chemically bound water of hydration and to minimize the level of the hydroxyl groups) was also utilized. The calcined silica was fed to the reactor at short intervals (approximately every one to five minutes) to maintain an acceptable concentration level of silica in the reactor and to prevent defluidization and/or agglomeration. The gas velocity in the fluidized bed reactor was approximately in the range of about 1.6 to 2.7 ft/s. The major operating variables were the reactor temperature which can range from about 30° C. to 70° C. and partial pressure of propylene which can range from about 40 to 120 psi.

Example 8 shows the present invention as employed in the direct conversion from a Ziegler-Natta catalyst to a chromium-based catalyst polymerization as taught in U.S. Pat. Nos. 4,460,755 and 4,564,660.

Comparative Example 1

In a fluidized bed reactor an ethylene-propylene copolymer was produced using a vanadium catalyst, TIBA cocatalyst, and chloroform promoter at 50° C. The partial pressure of ethylene was about 30 psi and the $H_2/C_2$ ratio was about 0.02 to 0.04. The $C_3/C_2$ ratio was kept in the range of 2.30 to 3.30 to produce amorphous EPM. The reactor was operated by initially using carbon black as a fluidization aid.

The reactor was heated and purged simultaneously with nitrogen to remove absorbed water and oxygen which act as a poison for the reaction. As the reaction was stabilized, the carbon black level was reduced and calcined silica was introduced as an inert particulate fluidization aid. The silica was a hydrophobic fumed silica (Cab-O-Sil TM TS-720 available from Cabot Corporation) having a primary particle size of 14 nanometers a specific surface area of 100 m$^2$/gm and a density of 2.2 g/cc as the inert particulate material. The silica was introduced into the reactor through the bottom mixing chamber below the distributor plate. As the concentration of silica increased to 4 to 5 wt. % and the carbon black level dropped to 1 to 2 wt.%, the static level increased in the bed from neutral to $-600$ to $-700$ volts and the skin thermocouples indicated that sheeting was beginning to form on the reactor wall.

After producing product equivalent to 6.5 times the weight of the granular resin in the fluidized bed, temperature excursions of 1° to 2° C. above bed temperature were observed using thermocouples located just inside the reactor wall at an elevation of ½ reactor diameter above the gas distributor plate. Prior experience had shown that such temperature excursions are an indication that sheets are being formed in the fluidized bed reactor. Concurrently, bed voltage (measured using an electrostatic voltmeter connected to a ½ inch diameter spherical electrode located one inch from the reactor wall at an elevation of ½ reactor diameter above the gas distributor plate) increased from a reading of approximately $-600$ to $-1000$ volts to a reading of over $-2000$ volts over a 3 minute period. Temperature and voltage excursions continued for approximately 12 hours and increased in frequency and magnitude. During this period, sheets of fused EPM resin began to appear in the resin product. Evidence of sheeting became more severe, i.e., temperature excursions increased to as high as 20° C. above bed temperature and stayed high for extended periods of time and voltage excursions also became more frequent. The reactor was shut down because of extentive sheeting.

Examples 2-3

In Examples 2-3, the reactor was started under conditions similar to Comparative Example 1, except that no carbon black was used to control the static charge build-up in the reactor. In Example 2, over a period of 0.5 to 1 hour up to 20 charges (approximately 10 to 50 grams each) of silica powder were added to the reactor. In Example 3, over a period of 0.5 to 1 hour up to 20 charges (approximately 10 to 50 grams each) of titanium oxide, were added to the reactor. In both Examples 2 and 3, it was observed that negative static charges were generated by the intermittent injection of each of these powders, thereby demonstrating the effectiveness of the present invention to generate negative static charges in a gas-phase fluidized bed reactor and control positive static charge formation.

Example 4

The procedure as set forth in Example 1 was followed. Again, calcined silica was used as a colorable fluidization aid and, initially, a few injections of carbon black were added to the reactor to keep the static charge under control.

When the carbon black feed was stopped, the static charge level gradually became negative. After a single charge of magnesium oxide powder (about 10 grams) was injected into the reactor, negative static was changed to positive static for about 10 to 15 minutes before returning to the original level of static. Continuous injection of a small amount (about 10 grams) of magnesium oxide powder into the reactor changed the negative static to positive static.

Example 5

The reactor was started at 50° C. using a vanadium catalyst to produce EPDM (ethylene-propylene-diene) granular resin. The following conditions were maintained throughout the run: Temp.: 50° C.; $C_3/C_2$: 0.4; $H_2/C_2$: 0.001; $C_2$: 90 psi; 5-ethylidene-2-norbornene (ENB): 60-80 ppm; TIBA: 700 cc/hr; chloroform: 150 cc/hr; and gas velocity: 1.8 ft/s Calcined silica was used as a colorable fluidization aid. Carbon black was added intermittently to the reactor to keep the static activity level under control. As the silica concentration in the reactor increased to the range of 4 wt. % to 6 wt. %, the static level appeared to gradually become negative. Carbon black was administered every time the static level dropped below $-500$ volts to prevent build-up on the reactor wall.

The carbon black feed was stopped and magnesium oxide powder (about 10 to 50 grams) was introduced to neutralize the negative static generated by the fluidization aid. At first, two separate charges or injections of magnesium oxide powder significantly reduced negative static of $-300$ volt and maintained the level for more than 30 minutes. On the second repeat trial run, each charge of magnesium oxide (about 10 to 50 grams) reduced negative static electricity. The static level was controlled with the injection of magnesium oxide with no signs of sheeting build-up on reactor wall or sheeting skin formation. That static charge level remained close to neutral for about 5 hours when magnesium oxide was used to control the negative static.

Examples 6 through 7

In accordance with the procedure set forth in Example 5, a mixture (40 wt. % MgO and 60 wt. % silica) was added to the reactor in lieu of the MgO (Example 6). Likewise, in accordance with the procedure set forth in Example 5, a mixture (40 wt. % silica and 60 wt. % ZnO) was added to the reactor in place of MgO (Example 7). It was observed the introduction of both mixtures resulted in significantly reduced static charges as compared to the static charge level generated by silica.

Example 8

This example demonstrates the use of the method of the present invention to effectively reduce negative electrostatic charges generated in direct conversion polymerizations such as those taught in U.S. Pat. Nos. 4,460,755 and 4,564,660. Ethylene is copolymerized with butene-1 in the fluidized bed reactor system as described in Example 3 of U.S. Pat. No. 4,460,755. When the copolymerization reaction catalyzed by the Ziegler-type catalyst is converted into the chromium-based catalyst reaction, MgO (Maglite TM obtained from Marine Magnesium Company) is introduced into the reactor to neutralize or reduce the negative static charge generated by silica (Grade 952 MS ID obtained from Davison Chemical Division, W. R. Grace Company). Within a few minutes, about 10 minutes, of feeding the MgO, the negative static charge is reduced. The statice activity remains under control with an MgO feed rate of 1% to 5% based on the weight of the silica.

What is claimed is:

1. A method for reducing sheeting during polymerization of one or more olefin monomers in a fluidized bed reactor which comprises:
   1) continuously monitoring electrostatic levels in the reactor and;
   2) adding a positive charge generating inorganic chemical additive selected from among MgO, ZnO, $Al_2O_3$, CuO and mixtures thereof to the reactor, when negative electrostatic levels are detected; or
   3) adding a negative charge generating inorganic chemical additive selected from among $V_2O_5$, $SiO_2$, $TiO_2$, $Fe_2O_3$, and mixtures thereof to the reactor, when positive electrostatic levels are detected in amounts sufficient to create and maintain essentially neutral static charges in the reactor.

2. The method of claim 1 wherein the amount of charge generating inorganic chemical additive added to the reactor ranges from about 0.05% to about 25% based on the total weight of the polymer.

3. The method of claim 2 wherein the amount of charge generating inorganic chemical additive added to the reactor ranges from about 0.1% to about 2% based on the total weight of the polymer.

4. The method of claim 1 wherein the polymer produced by said method is homopolymer of ethylene or a copolymer of a major mole percent of ethylene and a minor mole percent of one or more $C_3$ to $C_8$ alpha-olefins.

5. The method of claim 4 wherein said polymer is (i) an ethylene propylene rubber, (ii) an ethylene propylene diene terpolymer rubber, (iii) a polybutadiene rubber, or (iv) a high ethylene content propylene block copolymer.

6. The method of claim 5 wherein said ethylene propylene diene terpolymer is a ethylene/propylene/ethylidene-norbornene terpolymer.

7. The method of claim 5 wherein said ethylene propylene diene terpolymer is a ethylene/propylene/hexadiene terpolymer.

8. The method of claim 1 wherein at least one positive and at least one negative charge generating inorganic chemical additive are added to the reactor in the form of a physical mixture or as a chemically-bonded blend.

* * * * *